Figure 1:
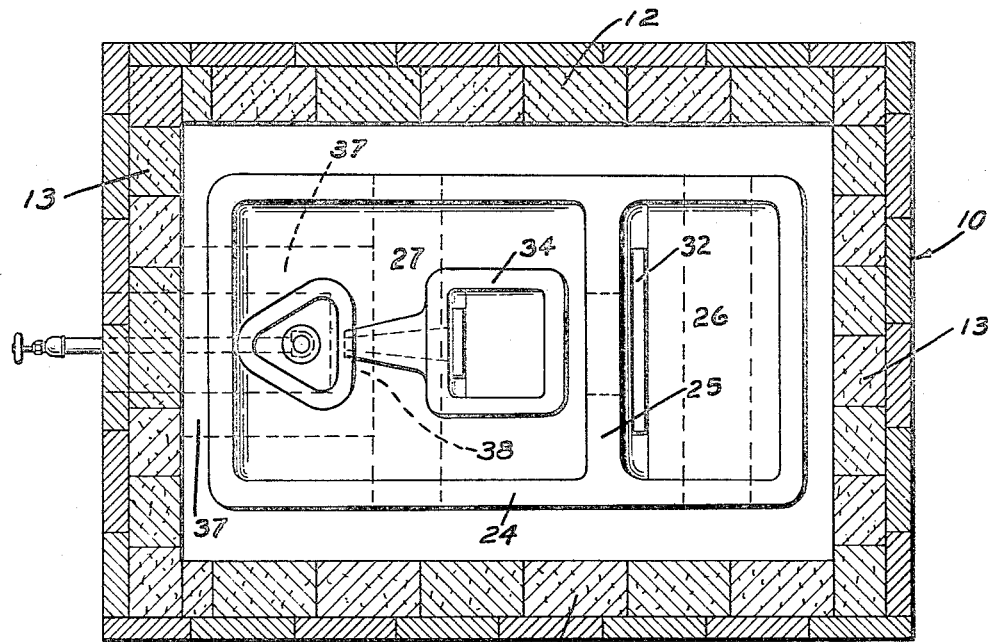

Patented Aug. 1, 1933

1,920,336

UNITED STATES PATENT OFFICE 1,920,336

METHOD AND APPARATUS FOR DRAWING GLASS

William J. Woods, Corning, N. Y., assignor to Corning Glass Works, Corning, N. Y., a Corporation of New York Application January 25, 1932. Serial No. 588,714

5 Claims. (Cl. 49—17.1.)

This invention relates to improvements in drawing glass and more particularly to the production of instrument tubing such as is used in the manufacture of thermometers, and the like.

In Patent No. 1,829,429 issued to me on the 27th day of October, 1931, I disclosed a method of and means for satisfactorily producing instrument tubing. I now find that by the method and apparatus herein disclosed I can also produce tubing which is equally satisfactory and in some instances superior to that heretofore produced by hand. Moreover, by using the method herein disclosed, tubing may be produced far more economically than by the hand methods heretofore employed.

The object of my invention is the economical production of drawn glass cane or tubing of definite and uniform cross-section containing a strip of contrasting glass which is definitely located within the finished article and is of uniform and definite cross-section.

The above and other objects may be attained by employing my invention which embodies among its features, drawing glass upwardly from a bath of molten glass, shaping the glass as the draw takes place, introducing below the surface of the bath of glass a strip of contrasting glass, shaping this strip of contrasting glass as it enters the glass which is being drawn and when so desired, forming a bore in the glass as it is being drawn.

Figure 2:
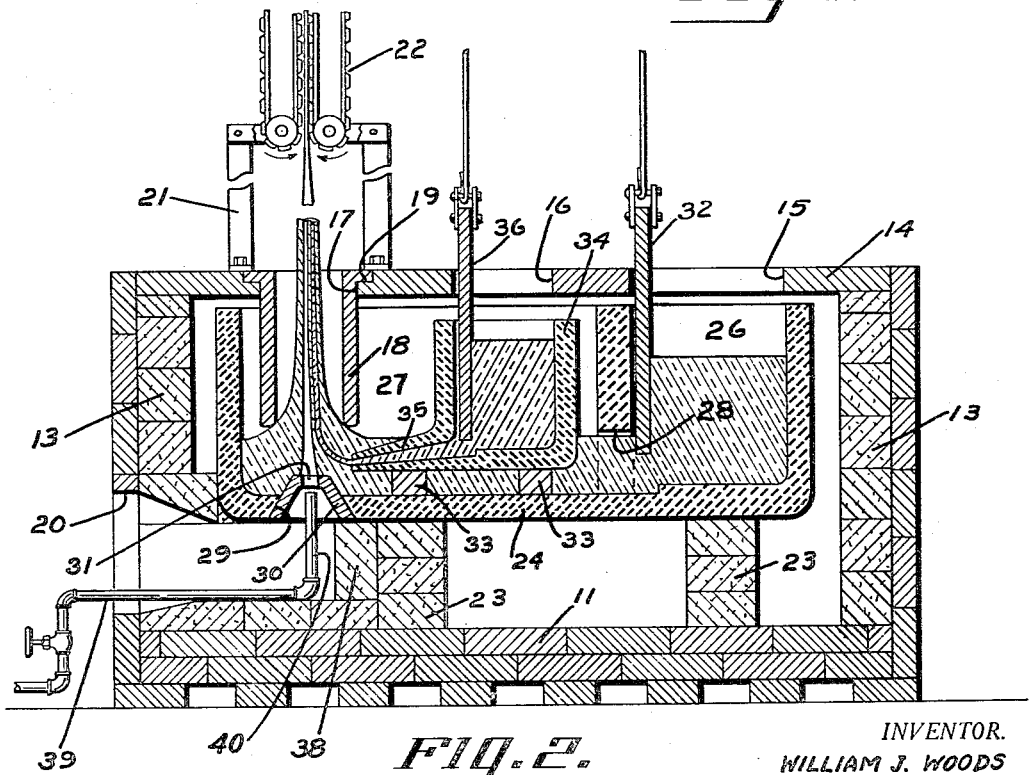

In the drawing:

Fig. 1 is a horizontal sectional view of a furnace showing the glass containers in position therein; and Fig. 2 is a vertical longitudinal sectional view taken on the line 2—2 of Fig. 1;

Referring to the drawing in detail, the furnace 10 consisting of a bottom 11, side walls 12 and end walls 13 is provided with a cover block 14 which is formed with filling openings 15 and 16 and a work-out opening 17, the latter being designed to receive a shaping sleeve 18 which is supported by an integrally formed annular outstanding flange 19. Formed in the end wall 13 nearest the work-out opening 17 is an opening 20, the purpose of which will hereinafter appear.

Mounted on a suitable frame 21 directly above the work-out opening is a tractor 22 by means of which the drawing of the glass is effected.

Supported in spaced relation to the bottom 11 of the furnace on the blocks 23 is a molten glass containing pot 24 which is provided with a partition wall 25 dividing the pot into two separate chambers 26 and 27 which communicate with each other through a throat 28. Directly beneath the work-out opening 17 the bottom of the pot 24 is provided with an opening 29 for the reception of a refractory nipple 30 having a central opening 31 for a purpose to be more fully hereinafter described. A gate 32 is let through the opening 15 of the cover block 14 into the chamber 26 of the pot 24 adjacent the partition wall 25 to control the flow of glass from the chamber 26 into the chamber 27.

Seated on suitable supporting blocks 33 which rest on the bottom of the pot 24 is a pot 34 which is provided with a tapered nozzle 35 through which molten glass flows toward the nipple 30. A gate 36 is let through the filling opening 16 of the cover block 14 into the pot 34 for controlling the flow of glass through the nozzle 35. It is obvious that the nozzle 35 may be shaped transversely to cause the stream of glass issuing therefrom to take any desired cross-section for instance, a crescent such as is commonly employed in instrument tubing.

Extending into the furnace in alignment with the sides and top of the opening 20 are partition walls 37, the inner ends of which are connected by an end wall 38 to define a chamber directly beneath the nipple 30. An air pipe 39 enters the chamber through the opening 20 and is provided with a vertical run 40 which terminates directly beneath the opening 31 in the nipple 30.

In operation, molten glass of the desired variety is deposited in the chamber 26 of the pot 24 and molten contrasting glass is deposited in the pot 34, it being understood that the glasses are kept in their molten condition by suitable burners (not shown) by which the temperature of the interior of the furnace 10 is maintained at the desired point. After depositing the glass as above described, the gate 32 is raised to admit the molten glass from the chamber 26 into the chamber 27, its level therein being regulated by the position of the gate. Molten glass flowing into the chamber 27 will completely submerge the nipple 30 which by reason of its relatively cool surface will slightly chill the glass which contacts with it. A bait is then let down through the work-out opening 17 through the shaping sleeve 18 until it contacts with the glass directly above the nipple 30. Upon drawing the bait upwardly it is obvious that glass will follow and upon being passed into the tractor 22 will continue the draw. Upon admitting air from the pipe 39 into the opening 31 of the nipple, it will be seen that a bore will be formed in the glass as the draw takes place, thus forming tubing. After thus starting the draw, the gate 36 is raised to the desired position and contrasting glass will then flow through the nozzle 35 and into the glass which is being drawn. The shape of this contrasting glass is definitely determined by the cross-sectional shape of the nozzle 35 and by reason of the depth of the nozzle in the bath of glass, the contrasting glass will be located very close to the bore in the finished tubing, it being obvious that the closer to the nipple that the contrasting glass is admitted to the chamber 27, the closer it will be to the bore in the finished tubing. As the glass is drawn upwardly, it is caused to take the desired cross-sectional shape by contacting with the lower edge of the shaping sleeve 18. As a result the finished tubing will have a definite cros-sectional shape, the bore will be definitely located in the tubing and the stripe of contrasting glass will be of definite shape according to the shape of the nozzle 35. Moreover, the stripe of contrasting glass will be definitely located with relation to the bore throughout the entire length of the draw. It is obvious that the drawing of tubing having its various elements definitely located may continue for as long a period as is desired by simply ladling sufficient glass into the pots 24 and 34 to maintain the necessary supply of molten glass in the chamber 27. It will be understood that as many strips of contrasting glass may be introduced into the tubing or cane as may be desired, their location and arrangement being determined by the positions of the respective nozzles of their containers 34.

While in the foregoing, there has been shown and described the preferred embodiment of my invention, it is to be understood that minor changes in the details of construction, combination and arrangement of parts may be resorted to without departing from the spirit and scope of the invention as claimed.

What I claim is:

1. The method of producing drawn glass having a contrasting strip embedded therein which includes drawing glass upwardly from a bath of molten glass, introducing a contrasting glass below the surface of the bath of glass near the point from which the glass is being drawn and shaping the contrasting glass as it enters the bath of glass.

2. The method of producing drawn glass having a strip of contrasting glass embedded therein which includes drawing glass upwardly over a cooled nipple from a bath of molten glass, introducing a contrasting glass below the surface of the bath of glass near the nipple and shaping the contrasting glass as it enters the bath of glass.

3. In an apparatus for drawing glass, a container for clear glass, a shaping sleeve projecting into the container from above and extending below the surface of the glass contained therein, means for drawing glass upwardly through the shaping sleeve, and a container for contrasting glass having a shaping nozzle which extends below the surface of clear glass for introducing a shaped strip of contrasting glass into the clear glass as it is drawn upwardly through the shaping sleeve.

4. In an apparatus for drawing glass, a container for clear glass, a shaping sleeve projecting into the container from above and extending below the surface of the glass contained therein, means for drawing glass upwardly through the shaping sleeve and a container for contrasting glass having a shaping nozzle which extends below the surface of the clear glass and under the shaping sleeve.

5. In an apparatus for drawing glass, a container for clear glass, a shaping sleeve projecting into the container from above and extending below the surface of the glass contained therein, means for drawing glass upwardly through the shaping sleeve, a container for contrasting glass having a shaping nozzle which extends below the surface of the clear glass for introducing a shaped strip of contrasting glass into the clear glass as it is drawn upwardly through the shaping sleeve and means for introducing air into the glass as it is being drawn to form a bore therein.

WILLIAM J. WOODS.